Aug. 23, 1932.  F. H. GULLIKSEN  1,873,761
GRID GLOW TUBE REGULATOR
Filed Feb. 2, 1931    2 Sheets-Sheet 1

WITNESSES:

INVENTOR
Finn H. Gulliksen.
BY
ATTORNEY

Aug. 23, 1932.　　F. H. GULLIKSEN　　1,873,761
GRID GLOW TUBE REGULATOR
Filed Feb. 2, 1931　　2 Sheets-Sheet 2

Fig.3.

WITNESSES:

INVENTOR
Finn H. Gulliksen.
BY
ATTORNEY

Patented Aug. 23, 1932

1,873,761

UNITED STATES PATENT OFFICE

FINN H. GULLIKSEN, OF WILKINSBURG, PENNSYLVANIA, ASSIGNOR TO WESTINGHOUSE ELECTRIC & MANUFACTURING COMPANY, A CORPORATION OF PENNSYLVANIA

GRID-GLOW TUBE REGULATOR

Application filed February 2, 1931. Serial No. 512,934.

My invention relates to regulator systems and it has particular relation to systems adapted to control, or maintain at a substantially constant value, the voltage of an electrical generator or circuit.

It is desirable that apparatus for regulating the voltage or other electrical condition of a generator or circuit be responsive to very slight changes in the quantity to be regulated and that, in addition, the equipment be capable of effecting a regulatory response without consuming an excessive amount of energy. Applicability of regulating apparatus to either alternating-current or direct-current machines or circuits is likewise highly desirable, in order that one general type of equipment may be capable of universal adaptability.

Voltage regulators of the rheostatic type, which control the voltage of a generator by actuating a motor-operated rheostat in the generator-field circuit, have heretofore been designed primarily for large machines. The solenoid types of control elements, which have been used in the past, require relatively large amounts of energy, which, for the larger machines, is of no particular disadvantage, but, for the very small machines, it becomes an extremely important consideration and limitation.

Thus, in applying voltage regulators of the rheostatic type to generators of very small capacity, the energy consumption required by the control elements of previously developed equipments has been found to constitute too large a burden to be practicable. In fact, in extreme cases, the total generator capacity may be no greater than the energy required by the regulator.

Furthermore, voltage regulators of the well known vibrating type are subject to the same disadvantage of excessive energy consumption when applied to generators of extremely low capacity. It will be evident, therefore, that a low-energy type of regulating system, such as is contemplated by this invention, fills a distinct need in this field of regulator applications.

It is an object of my invention to provide a regulating system in which the control element is responsive to very slight changes in the condition to be regulated.

It is another object of my invention to provide in a regulating system, a control element of high sensitivity which consumes only a small amount of energy and thus permits the regulator to be successfully used with generators of extremely low capacity.

It is a further object of this invention to provide, in a regulating system, a change-responsive control element, of high sensitivity and low energy consumption, which shall be adaptable for use with either alternating-current or direct-current machines and circuits.

To combine, in one regulating system, the advantages of low energy consumption, high sensitivity and universal applicability, my invention contemplates the utilization of an electric-discharge device or grid-glow tube as the controlling element.

As is known by those skilled in the art, the cold-cathode grid-glow tube type of electric-discharge device has practically infinite impedance up to a certain voltage. When this voltage is reached, the tube "breaks down" and passes a current through the circuit in which it is connected. I have discovered that an electric-discharge device, thus can, when properly connected, as in accordance with my invention, be used to energize control circuits to keep the voltage at this "break down" value. In carrying my invention into practice, I have found that the voltage-regulating capabilities of such a system are of a most extensive and satisfactory nature, for not only does the grid-glow tube require only an extremely small amount of energy, but it is likewise highly sensitive and quick to respond to voltage changes of the generator or circuit to which the system is applied.

Such a regulator is especially well adapted, as has been suggested, to applications where it is imperative that the load on the generator be limited to a low value and particularly where loads of a lagging power factor must be minimized, as, for example, in cases involving a small alternating-current generator supplying an ohmic load, with a voltage of practically sine-wave form, where little or no distortion of the wave form can be tolerated. As is known, generators of this type are used in 900-cycle telephone and other special test circuits. I have found that, when the voltage regulator of my invention is applied to such a generator, the burden or load thereon, due to the regulator, may be as low as 3.0 volt-amperes, at a power factor of substantially unity.

As will be seen, however, the regulator of my invention is in no way limited to smaller generators alone, or to alternating-current machines of the higher frequencies, but may be applied with equal success to machines of the larger capacities and to direct-current as well as to alternating-current machines and circuits.

The invention, both as to its organization and method of operation, together with additional objects and advantages thereof, will best be understood from the following description of specific embodiments, when read in conjunction with the accompanying drawings, in which.

Figure 1:
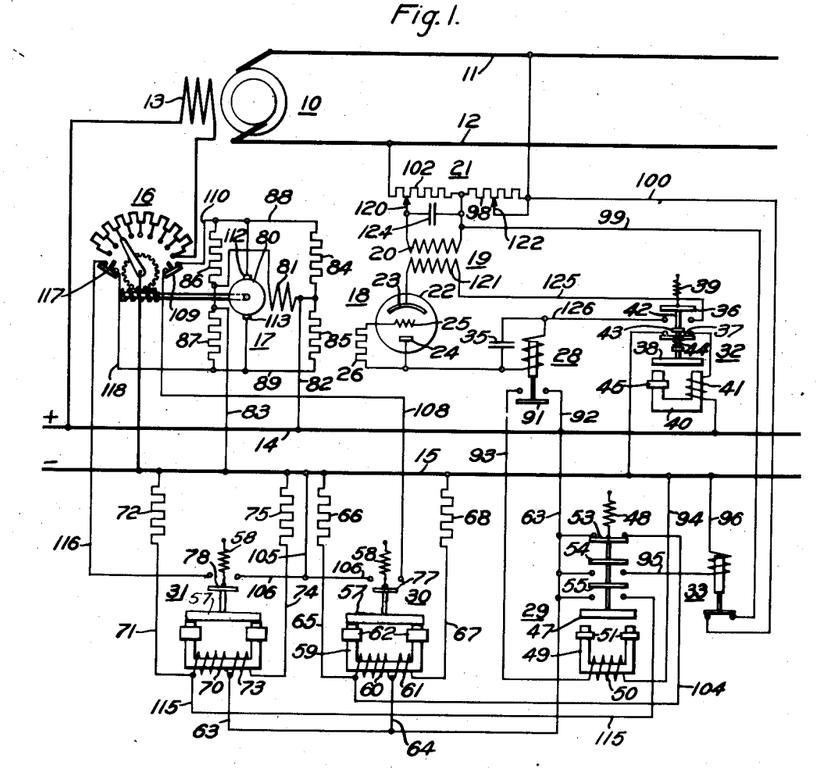
Figure 1 is a diagrammatic representation of the system of my invention applied to a single-phase alternating-current generator of relatively high frequency.

Referring to the drawings, and particularly to Fig. 1 thereof, my invention is there shown applied to a single-phase, alternating-current generator 10, which supplies voltage to a circuit, represented by conductors 11 and 12. The generator is provided with the usual exciting-field winding 13, which may be energized from any suitable source of direct-current voltage, represented, in Fig. 1, by control line conductors 14 and 15, of positive and negative potentials, respectively. A field rheostat 16, arranged to be driven in a well known manner by a suitable motor 17, is included in the supply circuit of the field winding to control the generator voltage.

The regulating system of my invention is disposed to control the operation of rheostat motor 17, in accordance with the generator voltage, and, to initiate such control, I employ an electric-discharge device or grid-glow tube 18 as the voltage-change-responsive element. Above a certain critical voltage, the tube "breaks down", and the motor driven rheostat is thereby caused to run in the voltage-lowering direction. Below the critical voltage, the tube does not break down, and the rheostat is caused to run the other way.

Proper arrangements are utilized to insure stability of operation and to prevent hunting, or overshooting of the corrective action, in the manner to be explained.

Device 18 is a cold-cathode grid-glow tube, of known design which has the characteristics just mentioned, and is connected, in any suitable manner, to be acted upon by the generator voltage. In the embodiment illustrated, such connection is made through the medium of a transformer 19, the primary winding 20 of which is connected to circuit conductors 11 and 12 through a potentiometer 21.

The type of electric-discharge device which I prefer to use in the system of my invention comprises an envelope 22, or air-tight glass container, in which are positioned a cathode 23, an anode 24 and a grid element 25. The grid 25 substantially surrounds the anode 24 and is interposed between it and the cathode 23. The envelope is filled with an inert gas, such as argon or neon, under an extremely low pressure. A device of this character is disclosed and claimed in the co-pending application of Dewey D. Knowles, Serial No. 149,290, filed November 19, 1926, and assigned to the Westinghouse Electric & Manufacturing Company. The electric-discharge device of the type disclosed in the Knowles application, above referred to, has the property of becoming conductive when the applied voltage exceeds a given critical value, and of remaining non-conductive when the voltage is below that value. It is to be understood, however, that any similar device having this property may be employed in the practice of my invention.

In the operation of the electric-discharge device 18, the voltage applied, whether it be alternating or uni-directional, between the anode 24 and the cathode 23, causes no current to flow between the device electrodes until the magnitude of the voltage is raised to the previously mentioned critical or breakdown value. After this point has been reached, the insulating properties of the gas within the space between the electrodes break down and a "glow-discharge" results, which allows a current to pass from the anode 24 to the cathode 23. The value of this critical voltage is determined by the amount of grid-leak resistance, which is connected externally between the grid 25 and anode 24 to control the rate at which the electrons, accumulating upon the grid element 25, are conducted away.

In grid-glow tubes of commercial design, such as I utilize in the system of my invention, this break-down voltage value may be controlled or varied from 325 volts, when the grid-leak resistance is zero, to approximately 850 volts, when the grid-leak resistance is infinite. The figures stated refer to the "peak" value of alternating-current voltage, and to direct-current voltage applied to make the anode positive with respect to the cathode. It will be understood that the "effective" or "root-mean-squared" values of alternating-current voltage corresponding to the "peak" values stated are somewhat lower, being of the order of 230 and 600 volts, respectively.

Essentially, the regulating system which I have illustrated in Fig. 1 comprises, in addition to the grid-glow tube voltage-responsive device 18, already described, relay 28 that is actuated by the current passed by the tube 18, and interposing relay 29 responsive to the action of the relay 28, rheostat-motor-control relays 30 and 31, disposed to be actuated by the interposing relay and to control the operation of the voltage-adjusting rheostat 16 in the "raise" and the "lower" directions, respectively. Combined with these elements is a tube-deionizing relay 32, which permits the system to successfully operate on direct-current and on alternating-current voltages of high frequency, and an anti-hunting relay 33 which, with its associated circuits, insures stability of operation of the regulator and prevents overshooting of the voltage-corrective action.

To be responsive to the break down of the grid-glow tube, the current-responsive relay 28 is connected in circuit therewith and is disposed to close a set of contacts to cause actuation of the other control devices in the system when a current flows through its winding. In practice, relay 28 may be of any well known type which requires, for operation, only a small current of a magnitude readily carried by the grid-glow tube 18 when the voltage impressed upon it is above the critical value. The current capacity of the grid-glow tube utilized by my invention is of the order of 10 milli-amperes.

As is known, a grid-glow tube inserted in an alternating current circuit acts as a rectifier, passing current only when the anode is positive with respect to the cathode. Consequently, the current supplied to relay 28 will be of a pulsating nature, and, to make most effective use of this pulsating direct-current, a condenser 35 may be parallel with the actuating coil of relay 28, to act as a reservoir for energizing current, and thus permit the relay to be operated from a smaller grid-glow-tube current. The type of relay which I prefer to utilize "picks up" at a current of approximately 5 milli-amperes, and releases when the current is reduced to approximately 3 milli-amperes.

Thus, in the system of Fig. 1, device 18 will allow current to pass and energize relay 28 if, when the anode is positive in relation to the cathode, the peak voltage of the alternating current across the device exceeds the selected break-down voltage which, as has been mentioned, is determined by the amount of grid-leak resistance 26. In practice, resistance 26 is adjusted to, and set at, the value which affords most satisfactory operation of the grid-glow tube.

When a grid-glow tube is energized from an alternating-current voltage of a low frequency, as of less than 100 cycles per second, the tube current is interrupted each time the anode voltage passes through zero, as has been mentioned. During the half cycle when the anode potential is negative, no current flows. Consequently, by varying the voltage impressed upon tube 18 slightly below or above the break-down point, relay 28 will open or close its contacts to control the operation of rheostat-operating motor 17, in a manner to be explained.

If, however, the grid-glow tube is connected to a source of much higher frequency, as in the region above 100 cycles, the gas within the tube does not have time to become deionized between positive half cycles, and, in order to interrupt the current flowing, it is necessary to reduce the impressed alternating current voltage to a value nearly equal to the "glow drop" across the tube which drop is considerably below the break-down voltage value, it being of the order of 160 volts. Hence, if satisfactory response to a lowering of voltage is had, some means for deionizing is required. It will be understood that a similar need for deionizing means arises when a grid-glow tube is connected to a direct-current source.

I have discovered that the grid-glow tube may be successfully applied as a voltage regulator for circuits of frequencies exceeding the 100-cycles-per-second value mentioned, and, for direct current circuits, if means are provided for momentarily disconnecting the impressed voltage long enough to allow the gas of the tube to deionize. In the regulator of my invention, I accomplish this through the use of relay 32, previously mentioned. A set of contacts 36 of relay 32 is inserted in the circuit of the grid-glow tube 18 in the manner shown. Contact 36 is caused to open and close continuously at a low frequency, and, to accomplish such action, I utilize another set of contacts 37 in series with the actuating coil of relay 32 to open the coil circuit when contacts 36 in the tube circuit close.

In practice, relay 32 may be of any well known fast-operating, slow-releasing type provided with the contacts mentioned, arranged in some manner equivalent to that shown in the drawings. Energization of relay 32 may be derived from the direct-current source, designated by control lines 14 and 15, and, when disposed in the manner illustrated, a vibrating action is set up, as will be evident. Movable armature 38, which is held in the upward position by tension of spring 39, is attracted downwardly to the stationary core member 40 by the magnetizing action of coil 41, energized through the circuit completed by contact member 37. In moving downwardly, armature 38 and attached plunger rod 42 move a collar 43, attached thereto, into engagement with contact segment 37, which is slidably mounted upon the rod and biased upwardly thereon by a compression spring 44. This action moves the contact member 37 out of engagement with the elements represented directly above it, and interrupt the energizing circuit of actuating coil 41.

Due to the increasing pull on armature 38 with decreasing air gap, and due to the stored magnetic energy in the core, sustained by action of lag loop 45, armature 38 will complete its travel and seal against the core although contacts 37 are opened at an intermediate point in the range of armature travel, provided, of course, a sufficiently high relay-coil current is being supplied. In the completely closed or actuated position, contact member 36 is brought into engagement with the contact elements placed immediately below it, thereby completing the grid-glow tube circuit.

The energy stored in the magnetic circuit of relay 32 persists for a time after the closure of armature 38, due to the well known action of a time-lag loop 45, or conducting ring placed around the magnetic core 40, and, in slowly dying away, allows armature 38 to open again, after a time, by action of the tension spring 39, thereby opening contact 36 and reclosing contact 37, to cause the operation just described to be repeated. It has been found that several interruptions per second are sufficient to permit the gas in the grid-glow tube 18 to be deionized, and, in practice, the interrupting relay 32 is adjusted to open and close at some such rate. It will be apparent that the time during which relay 32 is closed will considerably exceed the time during which it is open, due to the fast-operating, slow-releasing characteristic explained.

It will be evident that during the breakdown condition of the device 18, current-responsive relay 28 will alternately open and close its contacts in accordance with the vibrating action of deionizing relay 32, and, that when device 18 permits no current at all to flow, relay 28 will remain continuously in the open-contact position shown.

In order that the armature of interposing relay 29 may move to the actuated position and there remain when grid-glow tube 18 permits a current to pass, this relay is also of the fast-operating, slow-releasing type and may be similar to relay 32, already described, except that it must be somewhat slower in releasing after the actuating coil has been deenergized. As illustrated, the movable armature 47, biased in the upward position shown by a tension spring 48, is attracted downwardly to the stationary core member 49, with which is associated the actuating winding 50, and suitable time-lag loops 51. The function of the lag-loops is to sustain the magnetic flux after the relay has been actuated, and coil 50 has been deenergized, to thus give the relay the slow-releasing characteristic mentioned as being necessary. Relay 29 carries contacts 53, 54 and 55 which operate in the control circuits of "raise" motor-control relay 30, anti-hunting relay 33, and "lower" motor-control relay 31, respectively.

Rheostat-motor-control relays 30 and 31 may be of any suitable construction which provides a fast-closing, slow-releasing operating characteristic, the necessary condition being that each of these relays has a greater or longer time lag in releasing, after the actuating impulse has been removed, than does interposing relay 29, just described, for reasons to be explained. As illustrated, each relay is provided with a movable armature 57, biased in the upward position shown by a tension spring 58. A stationary magnetic core, designated, for relay 30, by reference numeral 59, is provided with two separate windings, a main or operating winding 60, of a comparatively large number of ampere turns, and a neutralizing winding 61 of a much smaller number of ampere turns. Time-lag loops 62 of heavy construction are placed upon the core member 59 to limit the rate at which the magnetic flux dies away after the energizing impulse has been removed. The main winding 60, is energized from the direct-current source through a circuit extending from positive conductor 14, through conductor 63, conductor 64, main winding 60, conductor 65, and a resistor 66, to negative conductor 15. In addition, winding 60 is disposed to be short circuited by contact 53 of relay 29, when closed as in the unactuated position of relay 29. Neutralizing winding 61 of relay 30 is continuously energized from the direct-current source through a circuit extending from positively energized conductor 64, winding 61, conductor 67, and resistor 68, to negative conductor 15. Winding 61 is disposed to supply a magnetizing force to relay core 59 which opposes or "bucks" the magnetizing action of the operating coil 60.

Similarly, the operating coil 70 of relay 31 is energized through a circuit which extends from positive conductor 14, through conductor 63, winding 70, conductor 71, and resistor 72, to negative conductor 15. The neutralizing winding 73 of relay 31 is energized through a circuit extending from positively energized conductor 63, through winding 73, conductor 74, and resistor 75, to negative conductor 15. Contact member 55 of interposing relay 29 is disposed, in the actuated position of relay 29, to short circuit winding 70.

In the operation of rheostat-motor-control relays 30 and 31, energization of both the main and the neutralizing windings causes the movable armature 57 to be attracted downwardly, against the action of the restraining spring 58, to the stationary magnetic core 59, since the main winding is of a sufficiently greater number of ampere turns than the opposing neutralizing winding to set up a compartively high flux intensity within the core. Short circuiting of the main winding, as by the action of the interposing relay contacts, removes the magnetizing force supplied by this winding and allows the neutralizing winding to slowly buck down the magnetic energy stored in the magnetic circuit, the rate of decrease being checked by the action of the time-lag loops associated with the stationary relay core.

After a predetermined time, the neutralizing winding reduces the flux to a sufficiently low value to allow the tension spring to pull the armature away from the core and return the relay to the unactuated position. As mentioned, this time lag in releasing is of greater duration than that of the interposing relay, and may be controlled in value by changing the relative number of ampere turns in the main and neutralizing windings, as by adjusting the external resistors in the winding-energizing circuits.

Actuation of relay 30 opens a contact 77, in the control circuit of rheostat-operating motor 17, and actuation of relay 31 opens a similar contact 78, also in the control circuit of motor 17. As represented, motor 17 is of the well known direct-current type, comprising an armature 80 and a shunt-field winding 81. The field winding is continuously energized from direct-current control conductors 14 and 15, through conductors 82 and 83 joined respectively thereto. The motor armature is connected, as shown, between two sets of similar resistors, comprising resistor elements 84 and 85, for one set, and 86 and 87, for the other set. Resistors 86 and 87 are disposed to be short circuited by the contacts of relays 30 and 31, respectively, in the unactuated position of the relays, and open circuited for the actuated relay positions.

As will be later made evident, relays 30 and 31 are both disposed to be maintained in their actuated positions when no change or adjustment in the voltage of generator 10 is required, and, for such a condition, resistors 86 and 87 are not short circuited. The voltage then impressed across the armature 80 of motor 17, or between conductors 88 and 89 in the diagram of Fig. 1, is zero, as an examination of the motor and control-resistor circuit will indicate. Short circuiting of resistor 86, effected by the movement of relay 30 to the unactuated position, causes a voltage unbalance or potential difference between conductors 88 and 89, which is of such polarity that motor 17 is caused to rotate in the voltage-raising direction. Similarly, when relay 30 is actuated, movement of relay 31 to the unactuated position, short circuits resistor 87, again setting up an unbalance in voltage between conductors 88 and 89, which voltage, thereby impressed upon the armature 80, is of the reverse polarity, from that in the first case, and the motor operates in the reverse or voltage-lowering direction.

This particular scheme of rheostat-motor control, which I have just described and which is well known in the art, has the advantage of providing dynamic braking, for the motor, without the use of a second set of contacts on the control relay which are represented in Fig. 1 at 30 and 31, and, for this reason, it is the type of scheme which I prefer to use with the system of my invention. It will be understood, however, that other motor-control schemes well known in the art may be used with equal success, and are readily adaptable to my regulating system. The only changes which would be entailed would lie in the number and arrangement of contact members provided with motor-control relays 30 and 31, and the necessary connections in conjunction therewith.

As will be seen, the normal voltage of generator 10, which the regulator system is set to maintain, corresponds to the break-down voltage of grid-glow tube 18, it being transmitted thereto through the medium of potentiometer 21 and transformer 19. Assuming that this normal voltage value maintains, grid-glow tube 18 breaks down, allows a current to pass between elements 23 and 24, which current, flowing through the actuating coil of relay 28, moves this relay to the actuated or upward position. It will be understood that current flow through the coil of relay 28 can occur only when contact 36 of deionizing relay 32 is closed, the function and operation of relay 32 being as previously explained.

Hence, for the break-down condition of grid-glow tube 18, relay 28 opens and closes, in accordance with the vibrating action of relay 32, and in so doing, transmits, through its contact 91, a series of energizing impulses to coil 50 of interposing relay 29, through a circuit which extends from positive control conductor 14, through conductor 92, contact 91 of relay 28, conductor 93, coil 50 of relay 29, and conductor 94, to negative control line 15.

Thus energized, relay 29 moves to the actuated position, in which it remains as long as tube 18 continues to pass current, since the delay in reopening relay 29, is greater than the time interval during which vibrating contact 91 of relay 28, is in the open position. In so closing, contact 54 of relay 29 completes an energizing circuit for antihunting relay 33, which circuit extends from positive control contactor 14, through conductor 63, relay contact 54, conductor 95, actuating coil of relay 33 and conductor 96, to negative control conductor 15.

Thus energized, relay 33 moves to the upward or actuated position and, in so doing, opens a circuit which its contact had established across resistor section 98 of potentiometer 21 by means of conductors 99 and 100, respectively. The opening of this circuit inserts resistor section 98 in series with section 102 of potentiometer 21, from which section primary winding 20 of transformer 19 is energized. As a result, the voltage impressed upon transformer 19 and grid-glow tube 18 is reduced somewhat below its original value, and, assuming the generator voltage to still remain at the desired normal value, this reduction is sufficient to bring the voltage impressed on grid-glow tube 18 below the breakdown value.

As a consequence, tube 18 no longer permits current to flow, and relay 28, in circuit therewith, is deenergized, moving to the unactuated position, in which contact 91 opens. Interposing relay 29, thus deenergized, also moves to the unactuated position, after the time delay for which it is set, and, in so doing, opens the energizing circuit of anti-hunting relay 33.

Anti-hunting relay 33, accordingly, moves again to its unactuated position, and, through its contact, short circuits section 98 of the potentiometer 21. As a result, the voltage impressed upon transformer 19 and grid-glow tube 18 is again raised to the original or break-down value, and the sequence of operation just described is repeated.

As long as voltage between conductors 11 and 12 remains at the desired normal value, grid-glow tube 18 will alternately pass and interrupt the flow of current at intervals determined by the time lag to opening and reclosing of interposing relay 29, and other inherent delays in the operation of the apparatus under consideration. Due to the fact that the time delay in reopening of rheostat motor control relays 30 and 31 is considerably longer than the intervals of successive closing and reopening of interposing relay 29, neither relay 30 nor relay 31 moves from its normally actuated position as long as operations just described, which occur for normal voltage of generator 10, are continued. It should be noted that, unless interposing relay 29 remains open or closed for a period exceeding the time delay required by relays 30 and 31, neither relay 30 nor relay 31 will have had sufficient time to move to the unactuated position shown in the diagram, and, consequently, for the normal voltage conditions assumed, both of these relays remain continuously in the actuated position, thereby maintaining contacts 77 and 78 thereof open. Such a condition results, as has been explained, in no voltage being impressed across the armature 80 of the rheostat-operating motor 17, and, consequently, the motor remains in a position of rest.

In the event that the voltage of generator 10 falls appreciably below the normal value, grid-glow tube 18 refuses to pass current, and relay 28 remains continuously in the unactuated position. This results in relay 29 also remaining in the unactuating position, and contact 53 of this relay continuously maintains a short circuit across the operating coil 60 of motor-control relay 30, this short circuit extending from one side of coil 60, through conductor 64, conductor 63, closed contact 53 of relay 29 and, conductor 104, to the other side of coil 60.

After the time relay required for relay 30 to be moved to the unactuated position, contact 77 is closed, by the opening action of the relay armature 57, and a short circuit is established across resistor 86 in the motor-control circuit, which circuit extends from one side of resistor 86, through conductors 83, 15, 105 and 106, closed contact 77 of relay 30, conductor 108, "raise" limit switch 109 of motor-operated rheostat 16 and conductor 110, to other side of resistor 86.

Thus short circuited, resistor 86, in effect, establishes a direct connection between negatively energized conductor 83 and conductor 88, with the result that terminal 112 of motor armature 80 is maintained at a negative potential with respect to terminal 113, terminal 113 being supplied with a positive potential of intermediate value from conductor 89, through resistor 85 and positively energized conductor 82.

Thus energized, motor 17 rotates in a voltage-raising direction, causing rheostat 16 to decrease the amount of resistance in the circuit of exciting winding 13 of the generator. This voltage-raising action continues until the voltage of the generator has been increased to a value sufficient to cause the grid-glow tube 18 to break down and pass a current, which current energizes relay 28, causing interposing relay 29 to close and remove the short circuit from operating coil 60 of relay 30, established by contact 53. Thus, operating coil 60 again becomes effective and causes relay 30 to move to the actuated position, thereby opening contact 77 and removing the short circuit from resistor 86. This action reduces to zero the voltage applied to motor armature 80, and the motor, consequently, ceases its rotation.

In closing, relay 29 also causes relay 33 to open and insert section 98 of the potentiometer resistance in active circuit, thereby reducing the voltage applied to grid-glow tube 18, and, assuming the corrective operation has been sufficient to bring the voltage to the desired normal value, the condition for periodic opening and reclosing of the interposing relay 29 is again established, acting, in the manner already explained, to prevent further operation of rheostat-operating motor 17.

In the event that the voltage of generator 10 rises an appreciable amount above the desired normal value, the lowering action of relay 33 is insufficient to reduce the voltage applied to grid-glow tube 18 below the break-down or critical value, and, as a result, the tube continues to conduct current after interposing relay 29 and anti-hunting relay 33 have been actuated. The effect is that interposing relay 29 remains closed continuously, and, in so doing, maintains a short circuit across operating coil 70 of "lower" motor-control relay 31, through contact 55. This circuit extends from one side of coil 70, through conductor 63, closed contact 55 of relay 29 and conductor 115, back to the other side of the coil 70.

After the time required for relay 31 to open, the armature 57 is actuated to the upper position, causing a short circuit to be established across resistor 87 through the closure of relay contact 78. This circuit extends from one side of resistor 87, through conductors 83, 15, 105 and 106, closed contact 78 of relay 31, conductor 116, "lower" limit switch 117 of rheostat 16 and conductor 118, to the other side of resistor 87.

This short circuit, in effect, establishes a direct connection between negatively energized conductor 83 and conductor 89, thereby impressing a negative potential upon terminal 113 of motor armature 80. Terminal 112 of the armature is maintained at an intermediate positive potential through conductor 88, resistor 84 and positively energized conductor 82.

Thus energized, motor 17 rotates in the voltage-lowering direction and causes rheostat 16 to increase the amount of resistance in the energizing circuit of generator-exciting winding 13, thereby lowering the voltage of generator 10. This lowering action continues until such time as the voltage impressed upon grid-glow tube 18 has been reduced below the critical or break-down value, when the tube ceases to pass current. Relay 28 then moves to the unactuated position, thereby allowing relay 29 also to open, after the time delay for which it is set.

The opening of contact 55 of relay 29 removes the short circuit from operating winding 70 of relay 31, causing this relay to move to the actuated position and open contact 78, which removes the short circuit from resistor 87 in the motor-control circuit, and the operation of motor 17 is thereby discontinued.

In opening, contact 54 of relay 29 interrupts the energizing circuit for relay 33, allowing it to short circuit resistor section 98 of potentiometer 21 and thereby raise the voltage impressed upon grid-glow tube 18. Assuming the voltage-lowering action has been sufficient to bring the generator voltage to the desired normal value, this increase in voltage, due to the anti-hunting relay 33, will be sufficient to cause grid-glow tube 18 to again break down, and the normal voltage operations of the system already described will be resumed until further deviation from normal value occurs.

To prevent mechanical injury to the motor-operated rheostat 16, the limit switches 109 and 117, previously mentioned in tracing the motor circuits controlled by relays 30 and 31, are provided to respectively interrupt the operation of the rheostat motor 17, by opening its operating circuit, when the limit of travel of the rheostat has been reached in either the raise or the lower direction.

The normal value of voltage to be regulated may be adjusted by any one of a number of means well known in the art, such as an adjustable contact 120 associated with resistor section 102 of potentiometer 21. Movement of this contact along the resistor, in effect, changes the ratio of the voltage between conductors 11 and 12 of the generator circuit, to the voltage applied to grid-glow tube 18, from the secondary 121 of the transformer 19. Thus, if the normal value of generator voltage is to be lowered, adjustable contact 120 may be moved to the left so that primary winding 20 of the transformer will be energized from a larger portion of the potentiometer resistor. Raising of the normal value of the generator voltage is similarly effective by moving adjustable contact 120 to the right.

In order to vary or adjust the sensitivity of the system, provision for changing the amount of resistance short circuited by anti-hunting relay 33 may be made, as through the use of an adjustable contact 122, associated, in the manner shown, with resistor section 98 of potentiometer 21. As will be evident, high sensitivity is obtained when the value of the potentiometer resistance acted upon by the anti-hunting relay is small, and correspondingly lower sensitivity of the regulator is obtained when the value of the section is large. It will be understood that the term sensitivity refers to the amount of variation above or below normal voltage required to initiate a voltage-corrective operation. It will be appreciated that, with this system, as in other regulating systems known in the art, a certain range of insensitivity is necessary to insure stability of operation and to prevent hunting or overshooting of the corrective action.

When this system is applied to alternating-current generators of extremely low capacity, it may be desirable to insert auxiliary means for causing the power factor of the regulator load, which is inherently of a lagging value, to very nearly approximate unity, and to do this, I have found that a condenser of proper electrical dimensions, connected across the primary winding 20 of transformer 19 is particularly effective. Such a condenser, shown at 124, acts to draw a leading current sufficient to neutralize the lagging component of the current drawn by transformer 19, correcting the power factor to unity, which unity power factor results in minimum distortion of the generator-voltage wave form.

As has been explained, in connection with the operation of the system illustrated in Fig. 1, when the generator voltage remains above or below normal for a time interval exceeding the drop-out time of the motor-control relays, a voltage-corrective action will be effected to bring the voltage back to its normal value. When, however, the voltage is within the regulating range, as determined by the setting of adjustable contact 122, the interposing relay 29 will not remain in either the actuated or the unactuated position for a time exceeding the drop-out time of the motor-control relays and the rheostat-operating motor will remain at rest.

As has been pointed out, in connection with the operating characteristics of the grid-glow tube electric-discharge device 18, the use of special deionizing means is not necessary when the alternating-current voltage impressed upon the tube is of a low frequency, such as below 100 cycles. Consequently, the system of Fig. 1, although applicable to all frequencies, will operate satisfactorily when used with a generator or circuit having a frequency below the limit stated without the use of the deionizing relay 32. Removal of this relay necessitates only one change in the connections illustrated in Fig. 1, that of joining conductor 125 with conductor 126, which, in effect, is the same as maintaining relay contact 36 continuously in the closed position. For generators of the commercial frequencies of 25 and 60 cycles per second, simplification of the system represented in Fig. 1 by the removal of relay 32 is, therefore, possible and practical.

Figure 2:
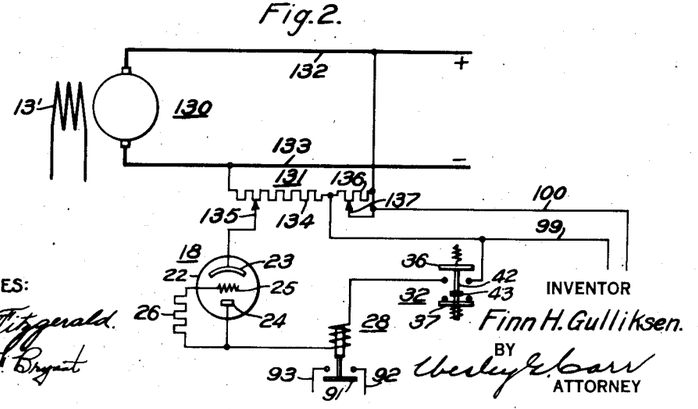
Fig. 2 is a diagrammatic representation of the connections required to adapt the system of Fig. 1 to a direct-current generator.

As has been previously mentioned, the regulating system of my invention may also be applied to direct-current generators of voltages exceeding the break-down value of the grid-glow tube utilized. Fig. 2 illustrates the changes in the connections of the system of Fig. 1 necessary to adapt the system, there shown, to a direct-current generator. It will be apparent that the only changes required are in the method of connecting the grid-glow tube 18, and the associated relays 29 and 32, to be acted upon by the voltage of the direct-current generator 130.

To effect such connection, a potentiometer 131 is connected across the generator line conductors shown at 132 and 133, respectively, and a portion 134 of the potentiometer resistance may be utilized, in the manner shown, to impress on the grid-glow tube 18 the voltage required to effect regulatory action or response by the tube. Adjusting means, in the form of a tap connection 135, may be provided to change the normal value of the voltage regulated. The anti-hunting relay is disposed in a manner, similar to that shown in Fig. 1, to act upon a section 136 of the potentiometer resistance 131, and sensitivity-adjusting means, in the form of an adjustable tap 137, may be associated therewith.

In making the connections to the direct-current generator circuit, it is necessary that the anode 24 of the grid-glow tube 18 be disposed to be acted upon by a positive potential with respect to the cathode 23, since, as has been pointed out, the tube is capable of passing current in one direction only. The only limitation to the application of the grid-glow-tube regulator to direct-current devices is that the voltage of the circuit regulated must be somewhat above the critical or break-down value of the tube which is used. As will be understood, the amount by which the circuit voltage exceeds the grid-glow-tube break-down voltage may be taken care of by means of the interconnecting potentiometer 131.

Figure 3:
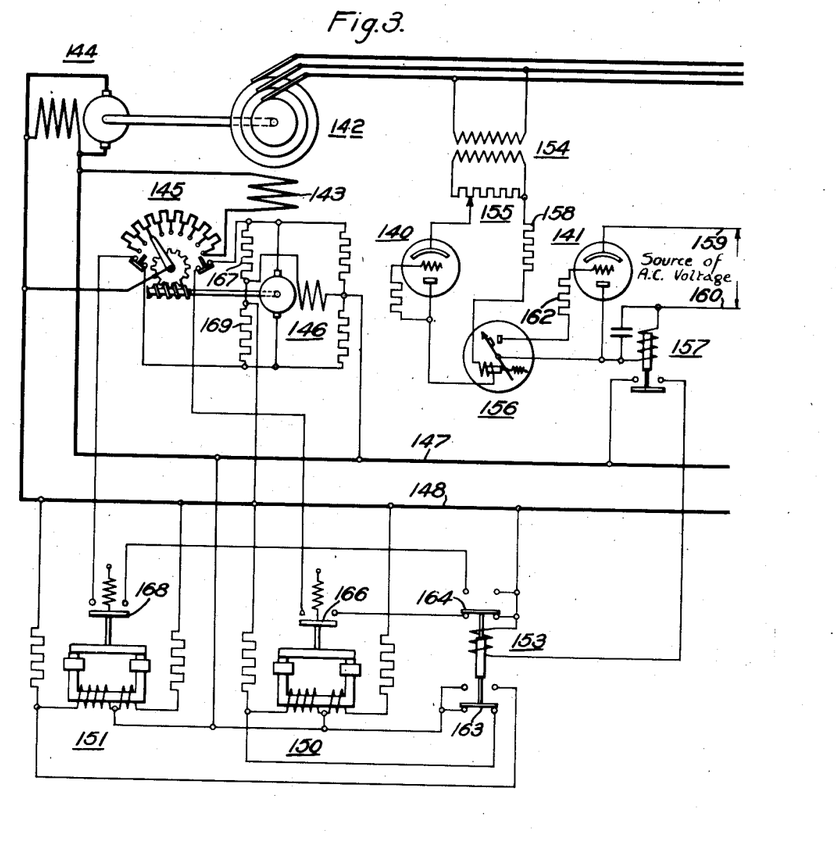
Fig. 3 is a special modification of my invention suitable for use with alternating-current generators of frequencies below 100 cycles per second.

In Fig. 3, I have illustrated a special modification of my invention which is applicable to alternating-current generators or circuits having frequencies below 100 cycles per second. This system makes use of two grid-glow tubes, illustrated at 140 and 141, and is shown applied to a three-phase, alternating current generator 142, the field winding 143 of which is excited, by a direct-connected exciter 144, through the motor-operated rheostat 145. The control relays used in the system, and the rheostat-operating motor 146, are shown as energized from the exciter conductors 147 and 148, of positive and negative potentials, respectively "raise" and "lower" motor control relays 150 and 151, respectively, control the operation of motor 146 in the manner explained in connection with the system of Fig. 1, these relays and the motor control circuits being practically identical with those illustrated in Fig. 1.

Grid-glow tube 140 acts as the voltage-responsive device for this system, and is coupled with the generator circuit through a transformer 154, and voltage-adjusting means 155. A current-responsive relay 156 having low inductance is included in the tube circuit in series circuit with a current-reducing resistor 158. In practice, I prefer to utilize a contact-making milli-ammeter for device 156, to permit of a further reduction in the energy consumption required by grid-glow tube 140, and I have, accordingly, illustrated such a milli-ammeter in Fig. 3.

Grid-glow tube 141 performs an interposing or impulse-amplifying function, rather than a voltage-detecting function and serves to transmit the impulses arising in milli-ammeter 156 to a relay 157, which, in turn, controls the actuation of an auxiliary relay 153. To energize grid-glow tube 141, an alternating-current voltage is impressed from an auxiliary source between conductors 159 and 160. The magnitude of this voltage is somewhat in excess of the break-down value for tube 141, when the grid-leak resistance 162 is effective, and it is of a frequency below 100 cycles per second.

As will be evident, the contacts of low-current ammeter 156 are disposed to act in the grid circuit of tube 141. As is known, an exceedingly small current is sufficient to control the grid, and, for this reason, consequently, all difficulty which might arise from the arcing of the contacts of device 156, in breaking the grid circuit during regulating operations, is eliminated.

Let it be assumed that the voltage of generator 142 is at the normal desired value which, as in the previously explained system, corresponds to an impressed voltage upon grid-glow tube 140 equal to the break-down value of the tube. In breaking down and passing a current, tube 140 causes current-responsive relay 156 to move to the actuated position.

Relay 156, when built in the form of a direct-current, contact-making, highly sensitive ammeter, gives, in conjunction with resistor 158, the tube circuit a high power factor, so that the "break down" and "break off" point of tube 140 is sharply defined. For this reason, when the voltage is normal, relay 156 will be continuously closing and opening, and additional anti-hunting means are not required. That is, current flow through the tube circuit slightly reduces the voltage which is effective in maintaining the break-down condition, and the break-off condition is thereby established, causing, at the normal generator-voltage condition, successive opening and reclosing of the contacts of device 156.

For such a normal voltage condition, therefore, relay 156 will be opening and closing continuously, and, as will be observed, its contacts establish and interrupt, in accordance with its actuation, the grid-resistance circuit of interposing grid-glow tube 141 to vary, in effect, the grid resistance from the value of resistor 162, effective when relay 156 is unactuated, to an infinite value when the contacts of relay 156 are open.

The result of this change of grid resistance produces a corresponding change in the break-down voltage of tube 141. The value of the auxiliary voltage impressed between conductors 159 and 160 is so maintained that grid-glow tube 141 breaks down when relay 156 is in the actuated position, and does not break down when the grid resistance is infinite or when the contacts of relay 156 are opened. As a result, relay 157 vibrates in accordance with relay 156, since it moves to the actuated position when tube 141 passes current and returns to the unactuated position at other times.

Operatively associated with relay 157 is the auxiliary relay 153 which is provided with two sets of contacts 163 and 164, respectively. As will be evident, relay 153 follows the operation of relay 157, since it moves to the upward or actuated position when the contacts of relay 157 are closed, to energize the actuated coil thereof, and returns to the unactuated or downward position illustrated when the contacts are opened.

Thus, for the normal voltage condition assumed, relay 153 also vibrates in accordance with the movements of previously mentioned relay 156, and, in so doing, maintains both of the motor-control relays 150 and 151 in their actuated positions in the manner explained for the corresponding relays in the system of Fig. 1. It will be observed that contacts 163 act to short circuit the operating windings of relays 150 and 151 in a manner exactly like that already pointed out. Consequently, when relay 153 remains in neither the actuated nor the unactuated position for a time not in excess of that required for relays 150 and 151 to release, after a short circuit of their operating coils, both of these relays will remain closed, and no energizing circuits for rheostat-operating motor 146 can be established.

In the event that the voltage of the generator falls below the normal value, grid-glow tube 140 will fail to pass any current, relay 156 will maintain its contacts open continuously, grid-glow tube 141 will fail to pass any current, relay 157 will remain in the unactuated position, and relay 153 will not be energized. Contact 163 of relay 153, thus in the unactuated or downward position, short circuits the operating coil of "raise" motor-control relay 150, which relay after a time delay, moves to the unactuated position shown, to establish, through its contact 166, a circuit which short circuits resistor 167 in the motor-control scheme, and causes motor 146 to rotate in a voltage-raising direction. As in the previously explained system, the voltage-corrective action continues until the voltage impressed upon grid-glow tube 140 is raised to the break-down value, when the tube again passes current. This current acts to effect the removal of the short circuit from the operating coil of relay 150 and causes the relay armature to move to the actuated position to discontinue the operation of rheostat motor 146.

The absence of special anti-hunting means makes immediate discontinuance of rheostat-motor operations necessary, after the generator voltage has been corrected to the normal value, to prevent over-shooting. To obtain more rapid discontinuance, I connect contacts 164 of auxiliary relay 153 in series with contacts of relays 150 and 151, so that movement of relay 153 will be immediately effective in stopping the rheostat motor 146, it being understood that the pick-up of relays 150 and 151 is somewhat less rapid than the operation of relay 153.

Similarly, in the event that the generator voltage rises above normal value, grid-glow tube 140 will pass a current continuously, thus actuating relay 156 to close the grid-resistance circuit of grid-glow tube 141 and bring its break-down voltage below the voltage impressed upon the tube. Current accordingly flows therethrough, and relay 157 is moved to the actuated position, in which it energizes and actuates relay 153.

In moving to the upward position, contact 163 of relay 153 short circuits the operating coil of motor-control relay 151, causing it, after a time delay to move to the unactuated position and, through a contact 168, to establish a short circuit across resistor 169 in the rheostat-motor control scheme. Motor 146, accordingly, rotates in the voltage-lowering direction, and, at the time when the voltage has again been brought back to the normal value, the grid-glow tube 140 ceases to pass current, relay 157 is deenergized, and relay 153 is thereby moved to the unactuated position to remove the short circuit from the operating coil of relay 151, which stops motor 146. From this point, a continuous vibratory action of the relays 156, 157 and 153, already explained for the normal-voltage condition, continues until such time as further deviation from normal voltage takes place.

It will be understood that, if so desired, provision can easily be made, with either of the regulating systems of my invention, for field-forcing or impressing excess voltage on the generator field momentarily to obtain quicker response.

It will, therefore, be seen that, through my invention, I have provided a system whereby a grid-glow tube electric-discharge device may be successfully and practically applied to the voltage regulation of electrical generators or circuits.

Although I have shown and described certain specific embodiments of my invention, I realize that many modifications thereof are possible. My invention, therefore, is not to be limited to the specific details shown, except in so far as is necessitated by the prior art and by the spirit of the appended claims.

I claim as my invention:

1. A voltage regulating system for an electrical circuit comprising a grid-glow electric-discharge device connected to be energized in accordance with the voltage of said circuit and disposed to be non-conductive when the circuit voltage is below normal and conductive when the circuit voltage exceeds normal, means for rendering the device alternately conductive and non-conductive during short time intervals when the circuit voltage is of the normal value, relay means responsive to the current passed by said electric-discharge device, and means for controlling the voltage of said circuit in response to actuations of said relay means which persist uninterruptedly for more than a predetermined period of time.

2. In a regulator system, a grid-glow tube electric-discharge device, means for impressing upon said tube a voltage dependent upon an electrical condition of a circuit, said tube being disposed to be non-conductive when the circuit voltage is below normal and conductive when the circuit voltage exceeds normal, means for rendering the tube alternately conductive and non-conductive during short time intervals when the circuit voltage is of the normal value, relay means responsive to the current passed by said device, and electrical adjusting means for the circuit disposed to be operated in accordance with those actuations of said relay means which persist uninterruptedly for more than a predetermined period of time.

3. In a regulating system, a circuit, voltage-adjusting means for said circuit, electro-responsive switches for controlling the operation of said adjusting means, an electrical-discharge device influenced by the voltage of the circuit, said device being disposed to be non-conductive when the circuit voltage is below normal and conductive when the voltage exceeds normal, means, including a relay disposed to slightly decrease the voltage impressed upon the device when it becomes conductive, for rendering the discharge device alternately conductive and non-conductive during short time intervals when the circuit voltage is at normal, and relay means responsive to the current passed by said discharge-device, said relay means being disposed to control the actuation of said electro-responsive switches when the said electric-discharge device is continuously conductive or continuously non-conductive and to exert no control thereon at all other times.

4. In a regulating system for an electrical circuit, a grid-glow tube electric-discharge device having a cathode element, an anode element, and a grid element connected to the anode through an external resistance, means for impressing between said anode and said cathode a voltage dependent upon an electrical quantity of the circuit, relay means responsive to the current passed from the anode to the cathode, and means for controlling the said electrical quantity of the circuit in response to the actuation of said relay means.

5. In a regulating system for an electrical circuit, a grid-glow tube electric-discharge device having a cathode element, an anode element and a grid element connected to the anode through an external resistance, means for impressing between said anode and cathode a voltage dependent upon an electrical quantity of the circuit, relay means responsive to the current passed by said electric-discharge device, means for interrupting and reestablishing at short intervals the electric-discharge-device circuit, and means for controlling the said electrical quantity of the circuit in response to the actuation of said relay means.

6. In a voltage-regulating system for an electrical circuit, a grid-glow tube electric-discharge device having a cathode element, an anode element and a grid element connected to the anode through an external resistance, means for impressing between said anode and cathode a voltage dependent upon the voltage of the circuit, relay means responsive to the current passed by said electric-discharge device, means for slightly lowering the voltage impressed on said discharge device when breakdown and current flow therethrough occur, and means for controlling the voltage of the circuit in response to actuations of said relay means which persist continuously for a predetermined time, said persisting actuations occurring only when the voltage acting upon the discharge-device is sufficiently far above or below its break-down value to cause the device, disposed as described, to be continuously conductive or nonconductive respectively.

7. In a regulator system, an electrical circuit, means associated with said circuit for adjusting an electrical quantity thereof, electro-responsive means, having an actuating-time delay, for operating said electrical adjusting means, a grid-glow tube electric-discharge device having a cathode element, an anode element, and a grid element connected to the anode through an external resistance, means for impressing between said anode and cathode a voltage dependent upon the said electrical quantity of the circuit, means for slightly decreasing the voltage impressed between said device elements when breakdown and current flow therebetween occur, a relay responsive to the current passed by the discharge device and disposed to control the actuating circuits of said electro-responsive means, said responsive means acting to operate the said quantity-adjusting means when the current-responsive relay remains in either the actuated or the unactuated position continuously for a time exceeding the actuating delay of the said electro-responsive means.

8. A voltage-regulating system for an electrical circuit in which a grid-glow tube electric-discharge device is disposed to be acted upon by voltage supplied from said circuit, said device functioning to pass current when the circuit voltage is of or above a predetermined value and to prevent current flow therethrough when the voltage is below that value, a relay responsive to the current passed by said grid-glow tube, means for slightly decreasing the voltage impressed upon said device when breakdown and current flow therethrough occur, an interposing relay responsive to the actuation of said current relay, means for adjusting the voltage of said circuit, and time-delay-relay means disposed to control the actuation of said voltage-adjusting means in response to the actuation of said interposing relay.

9. A voltage-regulating system for an electrical circuit in which a grid-glow tube electric-discharge device is disposed to be acted upon by voltage supplied from said circuit, said grid-glow tube functioning to present infinite impedance to current flow when the circuit voltage is below a given value, and a low impedance to current flow when the voltage is of or above that value, a relay responsive to the current passed by said grid-glow tube, an interposing relay responsive to the actuation of said current relay, an anti-hunting relay, responsive to the actuation of the interposing relay, disposed to slightly decrease the voltage impressed upon the grid-glow tube when current flow therethrough occurs, means for adjusting the voltage of said circuit, and time-delay-relay means disposed to control the actuation of said voltage-adjusting means, in the raise and lower directions, in response to continuous maintenance of said interposing relay in the unactuated and in the actuated position, respectively.

10. A voltage-regulating system for electrical circuits comprising a grid-glow tube electric-discharge device disposed to be acted upon by voltage supplied from said circuit, said grid-glow tube functioning to present an infinite impedance to current flow therethrough when the circuit voltage is below a given value, and a low impedance when the voltage is of or above that value, means disposed to interrupt and reestablish the grid-glow tube circuit at short regular intervals, means for slightly decreasing the voltage impressed upon said tube when current flow therethrough occurs, a current relay responsive to the current passed through said grid-glow tube, an interposing relay disposed to present a time delay in opening, responsive to the actuation of said current relay, means for controlling the voltage of said circuit, and two longer time-delay control relays disposed for controlling the actuation of said voltage-control means in the "raise" and "lower" directions, respectively, said raise and lower voltage-control relays being responsive, respectively, to the unactuated and to the actuated positions of said interposing relay, when continuously maintained for a time exceeding the delay of the said control relays.

11. A voltage-regulating system for an electrical circuit comprising a grid-glow tube electric-discharge device disposed to be acted upon by voltage supplied from said circuit, said grid-glow tube functioning to present an infinite impedance to current flow therethrough when the circuit voltage is below a predetermined value and a low impedance when the voltage is of or above that value, a relay responsive to the current passed through said grid-glow tube, a short-time-delay interposing relay responsive to the actuation of said current relay, means for controlling the voltage of said circuit, two longer time-delay control relays disposed to control the actuation of said voltage-control means in the "raise" and "lower" directions, respectively, said raise and lower relays being responsive, respectively, to the unactuated and to the actuated positions of said interposing relay when continuously maintained for a time exceeding the delay of the said control relays, means for adjusting the ratio between the voltage in said circuit and that impressed upon said grid-glow tube, and an anti-hunting relay responsive to the actuation of said interposing relay and disposed, upon actuation, to decrease the ratio between the voltage in the circuit regulated and that impressed upon said grid-glow tube.

12. In combination, an electrical generator, excitation-control means associated therewith, motive means for the operation of said control means, a grid-glow tube electric-discharge device disposed to be acted upon by the voltage of said generator, said grid-glow tube functioning to present an infinite impedance to current flow when the voltage is below a predetermined value and a low impedance when the voltage is of or above that value, a relay responsive to the current passed through said grid-glow tube, a short-time-delay interposing relay responsive to the actuation of said current relay, and longer delay control relays disposed for controlling the operation of said excitation-control motive means, said control relays being responsive, respectively, to the unactuated and to the actuated positions of said short-time-delay relay, when continuously maintained, and means for slightly decreasing the voltage impressed upon the grid-glow tube when current flow therethrough occurs.

13. A voltage-regulating system for an electrical circuit comprising a grid-glow tube electric-discharge device disposed to be acted upon by voltage supplied from said circuit, and means for adjusting the ratio between the circuit voltage and that impressed upon said grid-glow tube, said grid-glow tube functioning to present an extremely high impedance to current flow therethrough when the circuit voltage is below a predetermined value and a low impedance when the voltage is of or above that value, a relay continuously disposed to interrupt and reestablish the grid-glow tube circuit, a relay responsive to the current passed through said tube, a short-time-delay interposing relay responsive to the actuation of said current relay, means for controlling the voltage of said circuit, two longer time-delay control relays disposed to control the actuation of said voltage control means in the "raise" and "lower" directions, respectively, said raise and lower relays being responsive, respectively, to the unactuated and to the actuated positions of said interposing relay when continuously maintained, and an anti-hunting relay responsive to the actuation of said short-time-delay relay and disposed, upon actuation, to decrease the ratio between the voltage in the circuit regulated and that impressed upon said grid-glow tube.

In testimony whereof, I have hereunto subscribed my name this 27th day of January 1931.

FINN H. GULLIKSEN.